Figure 1:
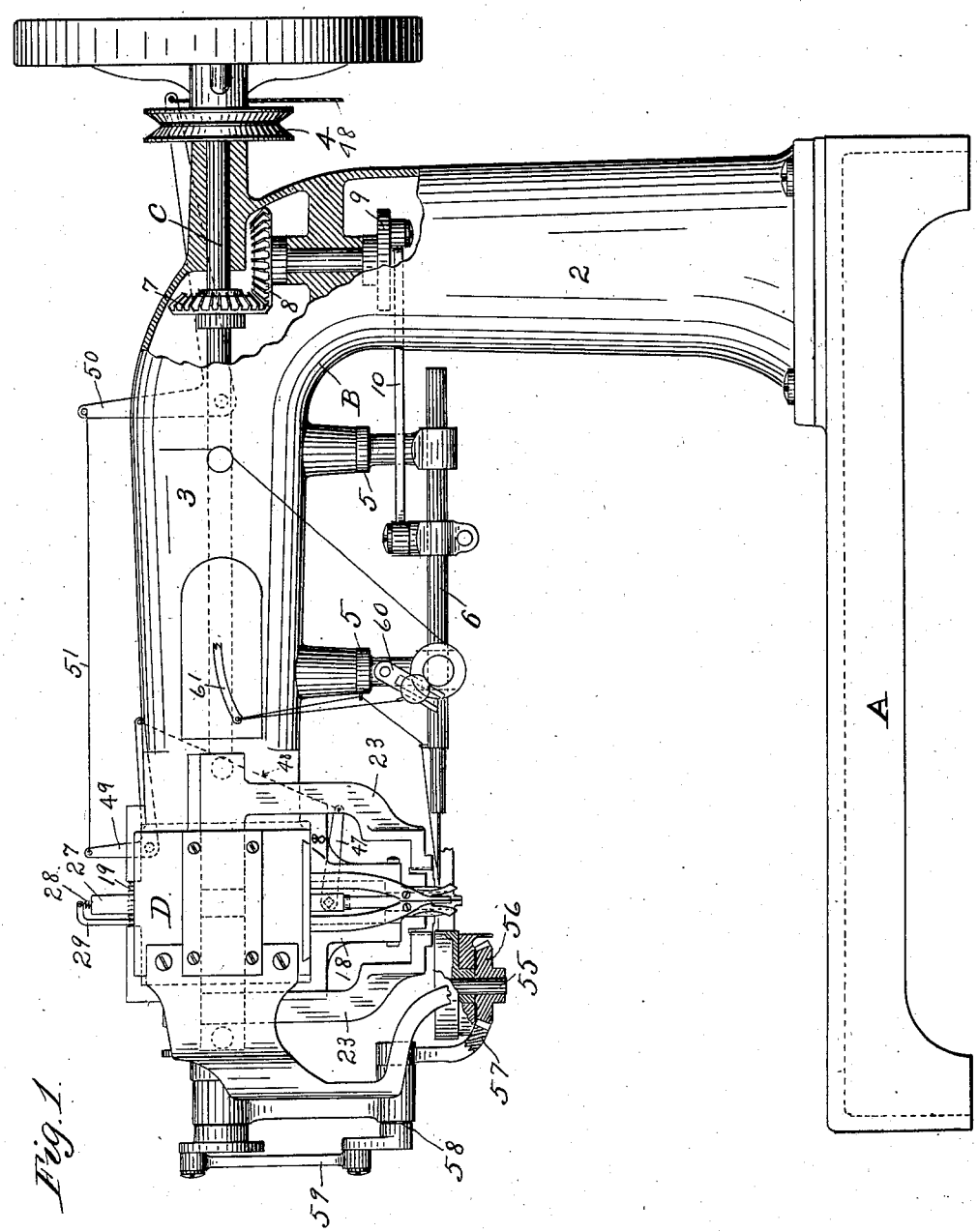

No. 751,544. PATENTED FEB. 9, 1904.
H. NEDERMAN.
AUTOMATIC TURNING AND SEWING MACHINE.
APPLICATION FILED MAR. 17, 1899.
NO MODEL. 10 SHEETS—SHEET 1.

Witnesses
A. H. Opsahl.
Elgie H. Craus,

Inventor.
Herman Nederman
By his Attorneys,
Merwin Lothrop & Johnson

No. 751,544. PATENTED FEB. 9, 1904.
H. NEDERMAN.
AUTOMATIC TURNING AND SEWING MACHINE.
APPLICATION FILED MAR. 17, 1899.
NO MODEL. 10 SHEETS—SHEET 3.

Witnesses
A. H. Opsahl.
Elgie H. Evans.

Inventor.
Herman Nederman
By his Attorneys
Merwin Lothrop & Johnson

No. 751,544. PATENTED FEB. 9, 1904.
H. NEDERMAN.
AUTOMATIC TURNING AND SEWING MACHINE.
APPLICATION FILED MAR. 17, 1899.
NO MODEL. 10 SHEETS—SHEET 4.
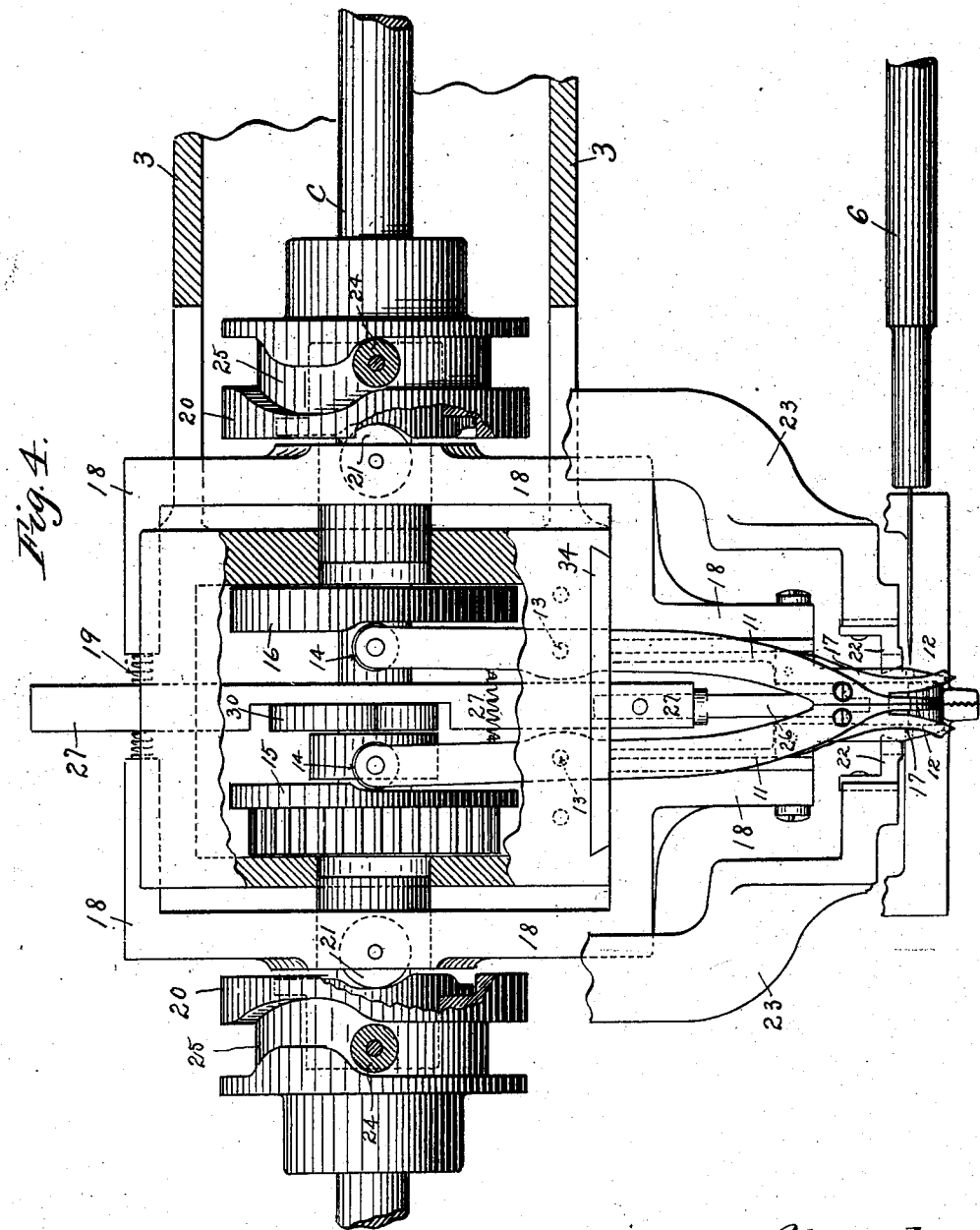
Witnesses
A. H. Opsahl.
Elgid H Evans
Inventor.
Herman Nederman
By his Attorneys
Merwin Lothrop & Johnson

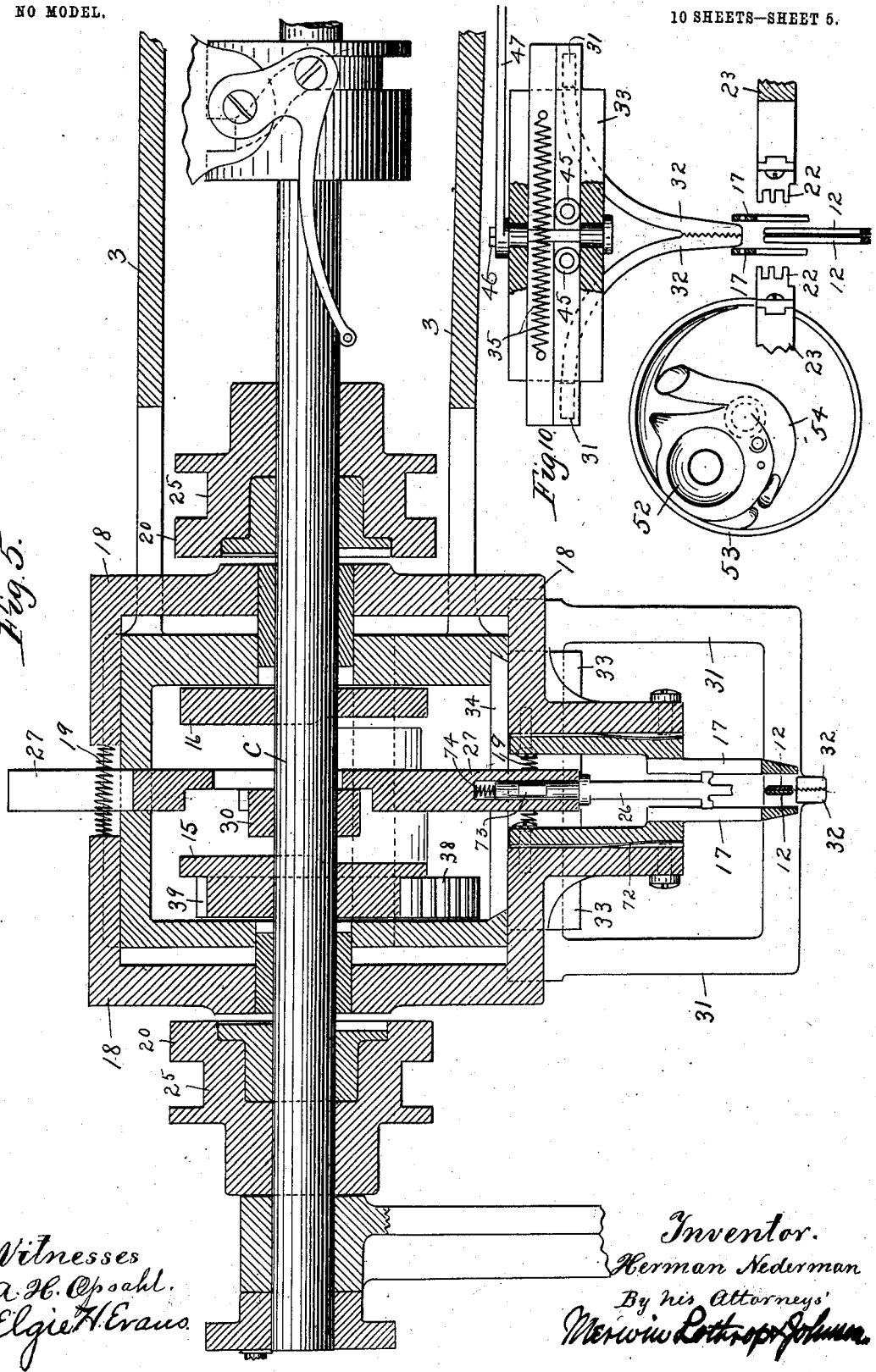

No. 751,544. PATENTED FEB. 9, 1904.
H. NEDERMAN.
AUTOMATIC TURNING AND SEWING MACHINE.
APPLICATION FILED MAR. 17, 1899.
NO MODEL. 10 SHEETS—SHEET 6.
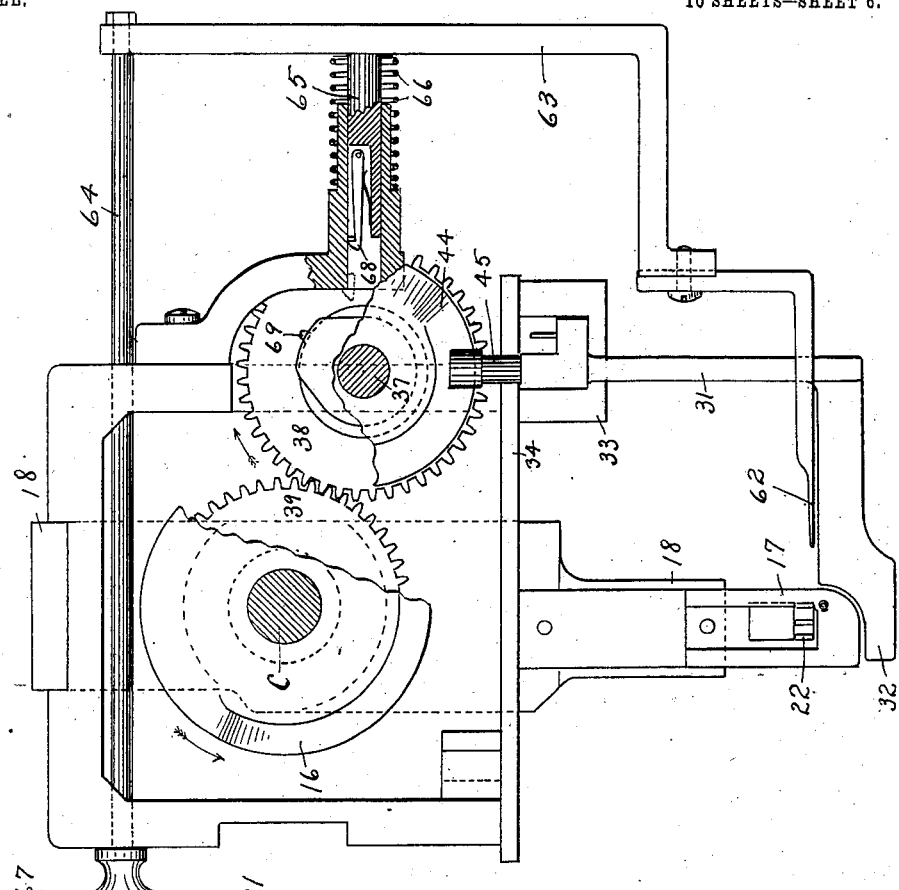
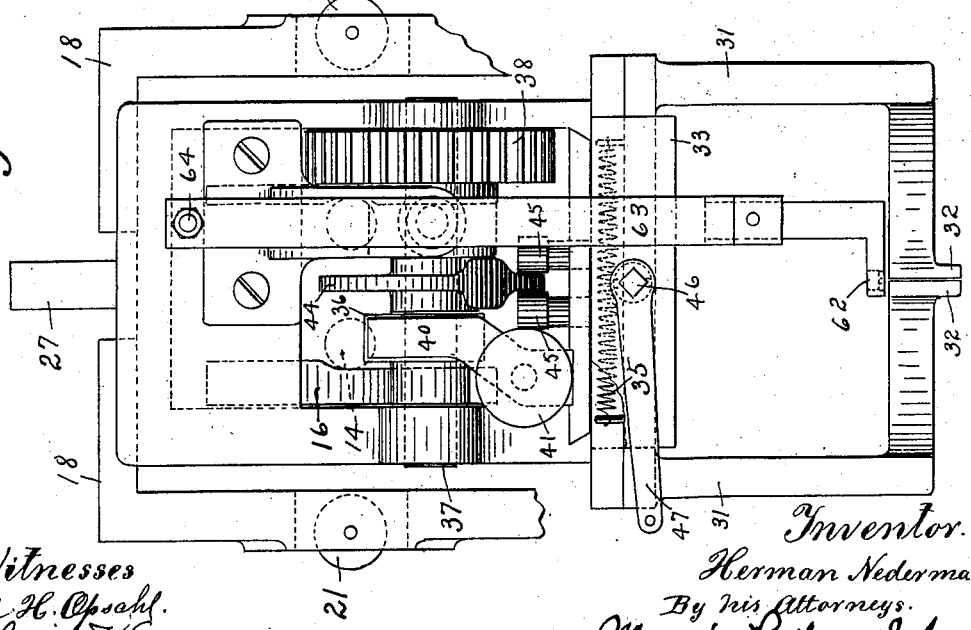
Witnesses
A. H. Opsahl.
Elgie H. Evans.
Inventor.
Herman Nederman
By his Attorneys.
Merwin Lothrop & Johnson

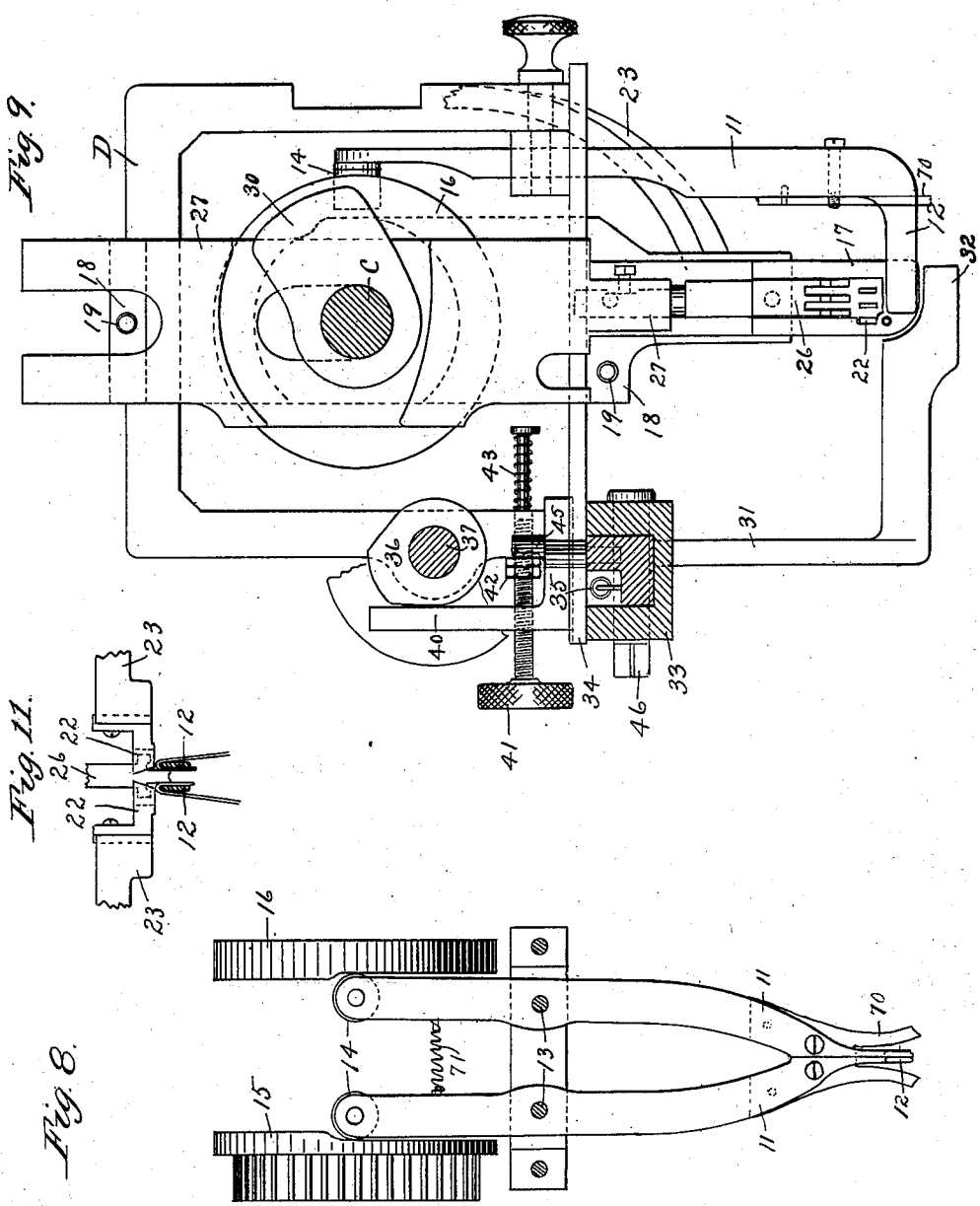

No. 751,544. PATENTED FEB. 9, 1904.
H. NEDERMAN.
AUTOMATIC TURNING AND SEWING MACHINE.
APPLICATION FILED MAR. 17, 1899.
NO MODEL. 10 SHEETS—SHEET 8.
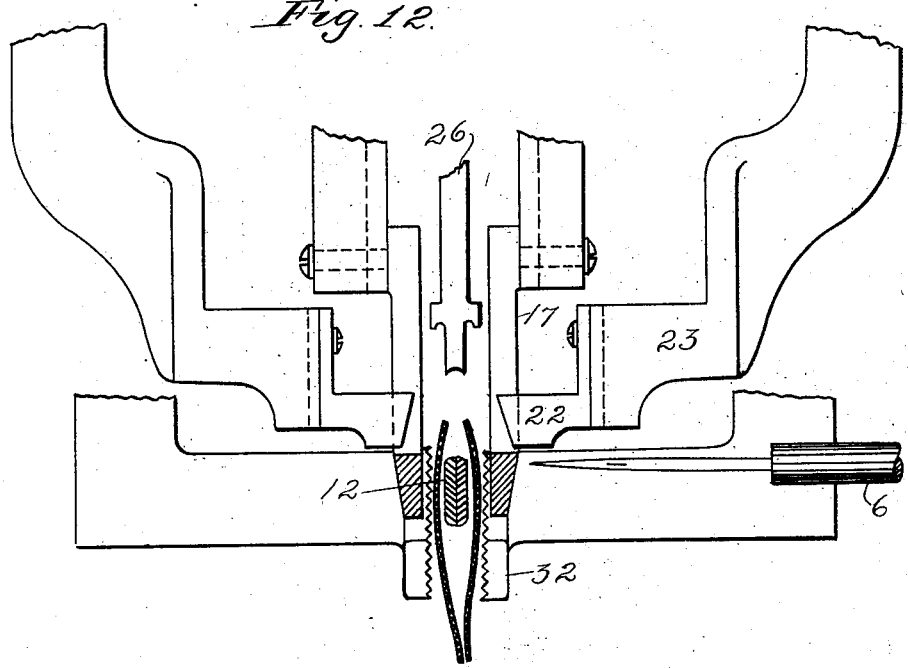
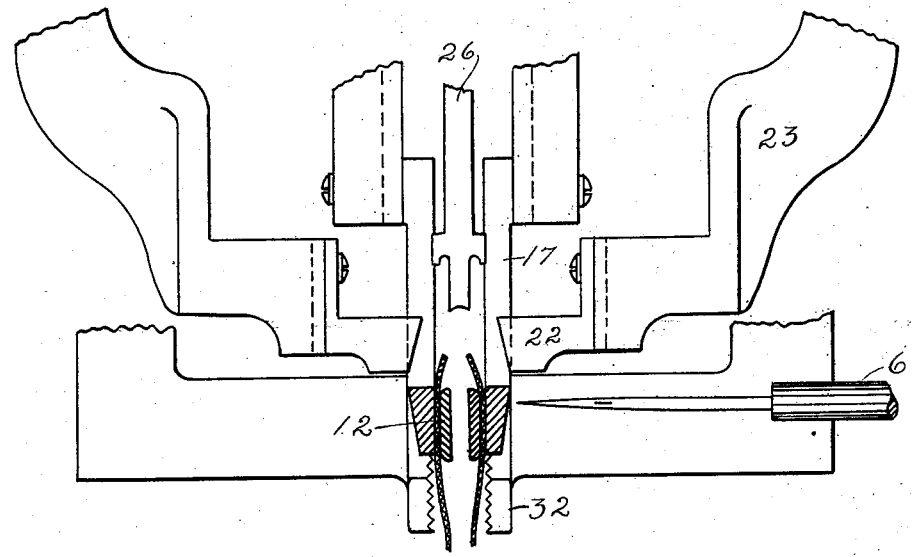

No. 751,544. PATENTED FEB. 9, 1904.
H. NEDERMAN.
AUTOMATIC TURNING AND SEWING MACHINE.
APPLICATION FILED MAR. 17, 1899.
NO MODEL. 10 SHEETS—SHEET 9.
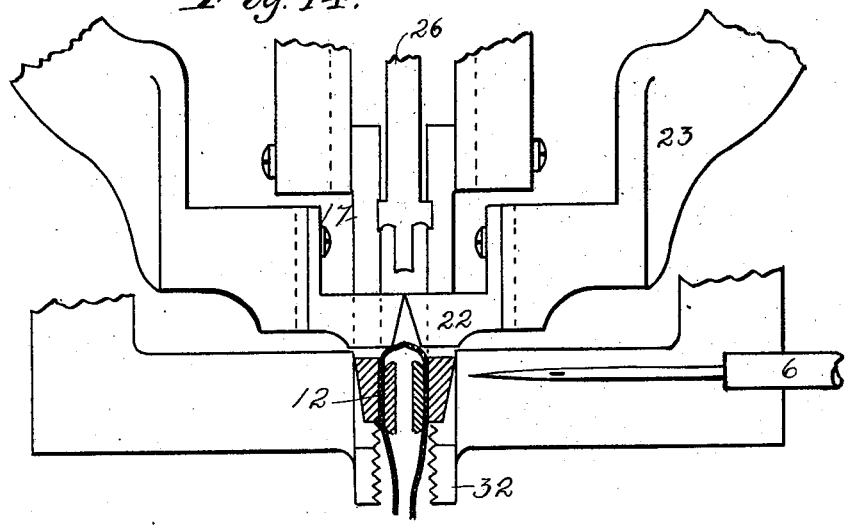
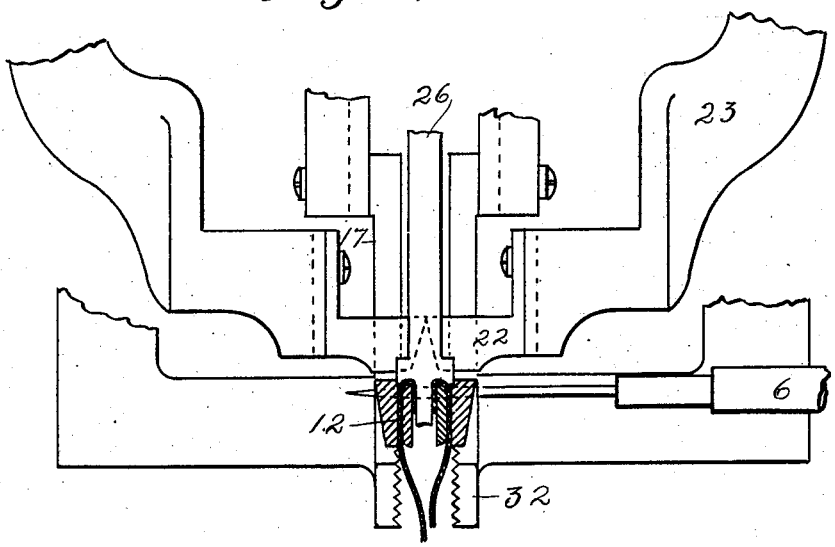
Witnesses.
Elgie H Evans
A. L. Thauwald.
Inventor
Herman Nederman
By his Attorneys
Merwin Lothrop & Johnson No. 751,544. PATENTED FEB. 9, 1904.
H. NEDERMAN.
AUTOMATIC TURNING AND SEWING MACHINE.
APPLICATION FILED MAR. 17, 1899.
NO MODEL. 10 SHEETS—SHEET 10.

Witnesses
Elgie H Kraus
H. L. Thauwald

Inventor
Herman Nederman
By his Attorneys
Merwin Lothrop Johnson

No. 751,544. Patented February 9, 1904.

UNITED STATES PATENT OFFICE.

HERMAN NEDERMAN, OF ST. PAUL, MINNESOTA, ASSIGNOR, BY DIRECT AND MESNE ASSIGNMENTS, OF THREE-FOURTHS TO EDWIN SLOANE AND THEODORE L. SCHURMEIER, OF ST. PAUL, MINNESOTA.

AUTOMATIC TURNING AND SEWING MACHINE.

SPECIFICATION forming part of Letters Patent No. 751,544, dated February 9, 1904.

Application filed March 17, 1899. Serial No. 709,404. (No model.)

*To all whom it may concern:*

Be it known that I, HERMAN NEDERMAN, of St. Paul, Ramsey county, Minnesota, have invented certain Improvements in Automatic Turning and Sewing Machines, of which the following is a specification.

My invention relates to improvements in edge turning and sewing machines, its object being particularly to provide mechanism for inturning and stitching the edges of such articles as cuffs, shoe-uppers, neckbands, &c. To this end I provide a suitably-actuated needle and means for carrying the plies of material through the machine, together with suitable step-by-step edge-turning mechanism coöperating with said needle.

In the accompanying drawings I show an adaptation of my invention designed particularly for the making of cuffs, neckbands, &c. In this construction two plies of material are carried through the machine across the path of the needle, a series of turning parts being provided in connection with the needle for engaging with the edges of the plies alternately with the movement of the needle to turn said edges inward sufficiently to receive the line of stitching.

Figure 2:
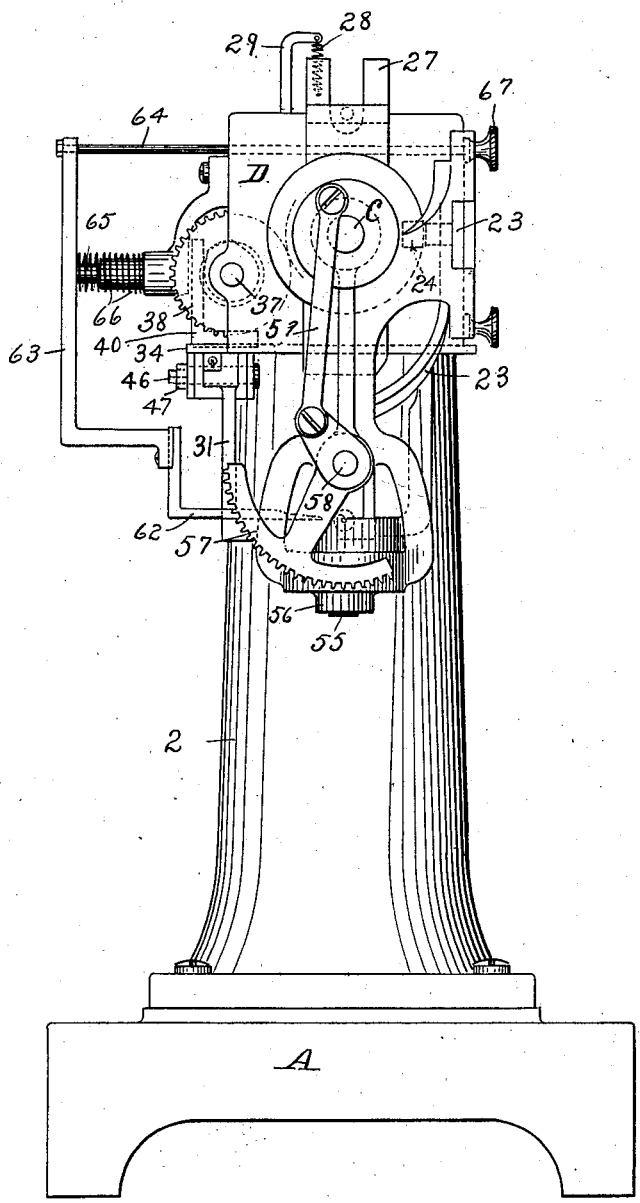
Figure 3:
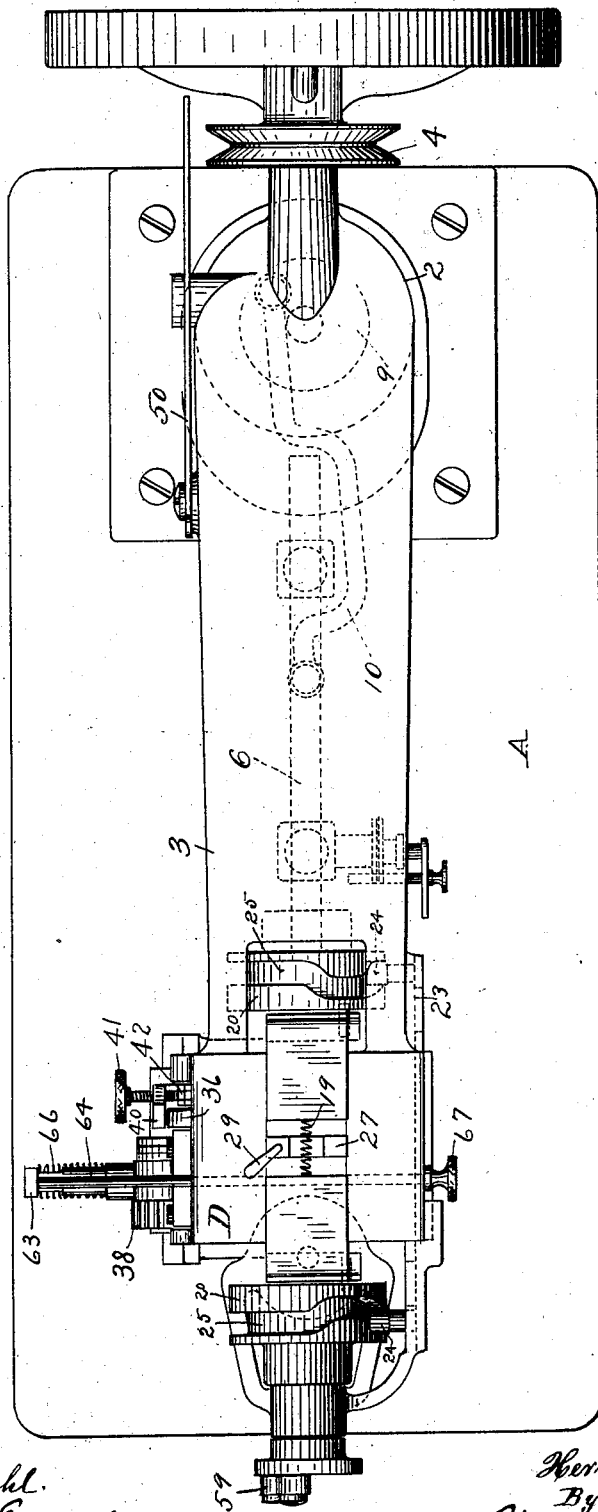

In the accompanying drawings, forming a part of this specification, Figure 1 is a front elevation of my machine. Fig. 2 is an end elevation. Fig. 3 is a top view of my machine. Fig. 4 is a front view of the machine-head, partly broken away. Fig. 5 is a vertical longitudinal section of said head. Fig. 6 is a rear view of the head, partly broken away. Fig. 7 is a vertical section through the head. Fig. 8 is a detail of jaws over which the edges of the material are turned and their actuating means. Fig. 9 is a vertical section of head looking toward one side of plunger-support. Fig. 10 is a top elevation of the bobbin, showing the adjacent jaws and the supports for the feeder-arms. Fig. 11 is a detail of the end of the folding-jaws and turner, showing the edges of the material turned over the jaws 12; and Figs. 12 to 16, inclusive, are detail views of the ends of the folding and turning means and adjacent parts, showing the positions assumed by the parts in the operation of turning and sewing.

In the drawings, A represents a suitable bed or table, and B the frame, consisting of an upright 2 and horizontal arm 3.

C represents the main driving-shaft, which has journal-support in the arm 3 of the machine and is operated from a suitable source of power through the medium of the belt-pulley 4. Journaled in supports depending from the arm 3 is a horizontal needle-bar 6, by which the first thread is supplied. The needle-bar is actuated from the driving-shaft through the medium of bevel-gears 7 and 8 and disk and pitman 9 and 10. While the sewing mechanism is shown operating in a horizontal plane, it will be evident that the parts may be so arranged that the needle will operate vertically, as in the ordinary sewing-machine.

Carried by the end of the horizontal arm 3 of the frame is a head D, in which most of the operating parts of the machine are arranged. Having fulcrum-support 13 in said head are lever-arms 11, provided upon their lower ends with rearwardly-projecting jaws or guides 12, over which the edges of the material are adapted to be turned. The arms 11 are provided upon their upper ends with rolls 14, which are engaged by the cams 15 and 16 to turn said arms upon their pivots, as hereinafter pointed out. The upper ends of said levers are held separated to bear against the cams 15 and 16 by means of the spring 17.

The material is held against the jaws 12 by means of the pressure-bars 17. These pressure-bars are supported by yokes 18, slidable upon the driving-shaft C. The yokes and pressure-bars are normally held separated by springs 19 and are forced inward in the operation of the machine by the cams 20 bearing against rolls 21, carried by said yokes. Springs 72 are interposed between the pressure-bars and yokes, serving as yielding support for bars.

The plies of material while being held against the jaws 12 are turned inward over the tops of said jaws by means of folding-jaws 22. These folding-jaws are carried by arms 23, which extend upward and are slidably supported at their upper ends in the head D, as shown in Fig. 1. The arms 23 are actuated by means of rolls 24, which are secured to the upper ends of the arms and which project into grooves 25 in the cams 20, secured upon the driving-shaft, as shown in Fig. 4.

The edges of the material when folded over the jaws 12 by the folding-jaws just described are turned downward between said jaws by means of a turner 26. The turner 26 slides in a slot in the bar 27 and is held pressed down by a spring 74, the movement of said turner being limited by a suitable pin passing through the bar 27 and projecting into a slot 73 in the turner. By adjusting the height of said pin the travel of the turner may be varied. The bar 27 is vertically slidable in the head and is normally held in raised position by means of a spring 28, connecting it with a support 29. The bar 27 is actuated to carry the turner downward by a cam 30, mounted upon the driving-shaft.

The means for carrying the material through the machine consists of arms 31, provided with inwardly-projecting serrated jaws 32 at their lower ends and at their upper ends having sliding support in a box 33, carried by a plate 34, slidably arranged in the head. The feeder-arms are normally held closed by a connecting-spring 35. The slide 34, which supports the feeding mechanism, is reciprocated by means of a cam 36, mounted upon a horizontal shaft 37, journaled in the rear of the head, said shaft being driven from the main driving-shaft through intermeshing gear 38 and 39. The slide 34 is provided with an upwardly-projecting post 40, with which the cam 26 engages to actuate the slide. In order to adjust the travel of the slide, and thereby regulate the stitch, I provide a thumb-screw 41, threaded through the post 40 and sliding loosely through the head of the machine. Nuts 42 are arranged upon the screw and bear against the rear of the head, and the end of the screw inside the head is surrounded by a spring 43, which presses against the inner side of the head and the inner headed end of the screw. It will be evident that by turning the thumb-screw the post 40 and connected feeding mechanism will be separated from or drawn toward the nuts 42, while at all times the spring 43 will hold said parts drawn inward, except when the same are being actuated by the cam.

In order to separate the feeder-arms in the operation of the machine, I mount a cam 44 upon the shaft 37, which cam engages with studs 45, projecting upward from the tops of the feeder-arms, as shown in Figs. 6 and 7. These studs work in slots through the slide and are separated by said cam.

In order to separate the feeder-arms when the machine is not in operation to allow the material to be placed therein, I arrange a cam-screw 46 between the upper ends of the feeder-arms, with which screw is connected an arm 47, said arm being connected with an operating-cord 48 at the side of the machine through the medium of a pair of bell-cranks 49 and 50 and connecting-cords 51. When the arm 47 is turned through the medium of said bell-cranks, the cam-screw will be turned to separate the feeder-arms. The second thread is supplied in the ordinary manner by means of a suitable bobbin 52, arranged in the case 53. The bobbin is held in the case by means of a suitable shuttle 54, secured upon the top of a vertical shaft 55. Upon the lower end of said shaft is mounted a bevel-gear 56, with which engages a toothed segment 57, operatively connected with the main driving-shaft by shaft 58 and connecting-rod 59. The operating of the driving-shaft thus reciprocates the segment, causing an alternately-rotary movement of the shuttle-shaft to bring the looper of the bobbin and the needle together to make a stitch. The thread is fed to the needle in the ordinary manner, passing through suitable feeding-arms 60 and 61.

In sewing together plies of material where corners are to be turned, as in cuffs, &c., it is desirable in some cases to use a supplementary device to hold the edges in position to be engaged by the turner, and for this purpose I provide a finger 62, carried by a vertical arm 63, which in turn is connected with a rod 64, extending through the head of the machine. The arm 63 also carries a bar 65, projecting into an opening in the head of the machine, as shown in Fig. 7. The arm 63 is held in rear position by a coil-spring surrounding the bar 65 and abutting at its opposite ends against the frame of the machine and the bar 63, respectively. When it is desired to turn the material upon the needle to allow a corner to be formed, the bar 63 is first pulled forward by means of the thumb-piece 67 and is locked in such position by a spring-controlled dog 68, carried by the bar 65, and which will engage with the frame, as illustrated in dotted lines in Fig. 7. This brings the point of the finger 62 between the edges of the material above the needle. The material is then turned by hand upon the needle. As the material is turned the spreader holds the edges of the fabric separated, so that the edges stand in the proper position to be engaged by the turner. The continued operation of the machine causes the dog 68 to be engaged by the spur 69, carried by the slide-operating cam, releasing the dog and permitting the spring 66 to carry the bar with the finger 62 to rear position.

In order to hold the plies of material in parallel position adjacent to jaws 12, guides 70 are secured to the jaw-supporting arms 11, as shown in Figs. 8 and 9.

Figure 16:
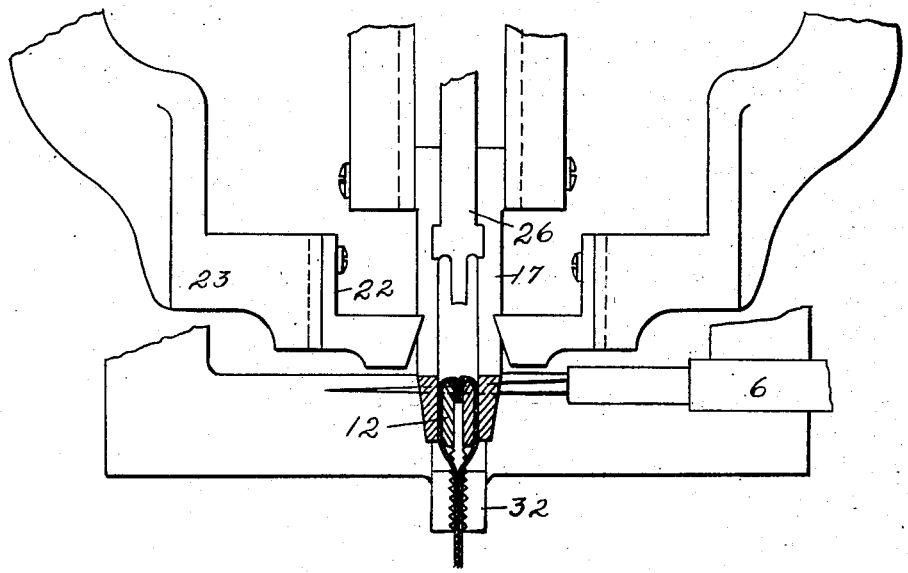

The operation of the machine is explained by views 12 to 16, inclusive. Fig. 12 represents the position in which the parts stand when the material is fed into the machine. In this position the pressure-bars are separated from the jaws 12, the turner is raised, the folding-jaws are separated, and the feeding-jaws are in forward position. The plies of material are passed between the jaws 12 and guides 70 and between the feeder-jaws, the feeder-jaws being separated for this purpose by depressing the treadle connected with the arm 50. The plies of material being thus placed, the treadle is released to allow the feeding-jaws to return to closed position. The machine being then started, the turning of the driving-shaft separates the jaws 12 and draws inward the pressure-bars to grip the material. The folding-jaws 22 are now carried inward by their actuating means, heretofore described, to turn the edges of the plies of material projecting above the jaws 12 over said jaws. The turner now descends, forcing the inturned edges of the material downward between the jaws 12, as shown in Fig. 15. The turner is then raised and the jaws 12 closed to press the inturned edges together, as shown in Fig. 16. The needle has now passed through the inturned edges of the material into the bobbin-case. As the needle is passing through the material the pressure-bars are slightly separated and again closed. As the needle is withdrawn from the bobbin-case the pressure-bars are again separated from the jaws 12 and the jaws 12 themselves slightly separated to permit the material to be drawn through the machine the length of a stitch by the feeding-jaws. It will be understood that after each passage of the needle the slide 34 is actuated to carry the feeder-arms to the rear and draw the material through the machine into position for a second passage of the needle. When the feeding-jaws have been carried to rear position, they are separated by the cam 44 and while separated are drawn to forward position by the spring which controls the slide. As they are brought to forward position the cam 44 turns sufficiently to allow said jaws to close and grip the material. By means of the adjustment heretofore described the degree of movement of the slide, and consequently the length of the stitch, may be varied. The continued operation of the machine continues the turning inward of the edges of the material and the sewing together of the inturned edges, the material being drawn through the machine the length of the stitch after each passage of the needle. It will be seen from the drawings that the needle is arranged in the rear of the folding-jaws and the turner, so as to pass through the edges of the material after the same have been turned. It will be understood that the shuttle and bobbin work in unison with the needle.

The above-described machine is designed especially for the making of such articles as cuffs, collars, the upper edges of shoes, &c., or by leaving out one set of the folding-jaws it may be used to turn one edge instead of a series. Further changes may be made in the mechanism without departing from the idea of my invention. The step-by-step action of the folding device allows the material to be turned upon the needle to form a turn in the edge, as at the corner of cuffs.

I claim—

1. Means for turning inward the edges of two or more pieces of material and stitching therethrough comprising in combination with a suitably-actuated needle, means for holding said pieces in the path of the needle, and means acting alternately with said needle for inturning the edges of said material.

2. Means for turning inward the edges of two or more pieces of material and stitching therethrough comprising in combination with a suitably-actuated needle, means for holding the edges of said pieces in the path of said needle, and means acting alternately with said needle to pass between said pieces and inturn the edges thereof.

3. Means for turning inward the edges of two or more pieces of material and stitching therethrough comprising in combination with a suitably-actuated needle, means guiding and holding the pieces in the path of said needle and intermittent, or step-by-step mechanism for inturning the edges of said pieces.

4. In combination with the stitching mechanism and guides for directing and holding two or more pieces of material with their edges parallel and in position to be stitched, moving means acting to successively thrust in portions of one edge of the material between the pieces to receive the stitches.

5. In a sewing-machine in combination with the needle and its actuating means, means for directing two or more plies of fabric with their edges parallel into the path of the needle and step-by-step mechanism acting alternately with the needle for thrusting the fabric edge between the plies to receive the stitching.

6. The combination of jaws or guides along the outer sides of which plies of material are adapted to be passed, slidable means for turning the edges of the plies between said jaws, feeding mechanism and sewing mechanism.

7. In a machine of the class described, the combination of means for receiving and holding independent plies of material in parallel position, an edge-turner, means for actuating said turner, and sewing mechanism.

8. In a machine of the class described, the combination of means for receiving plies of material, an edge-turner, an adjustable support therefor, means for actuating said turner, and sewing mechanism.

9. In a machine of the class described, the combination of means for receiving plies of material, a turner, a yielding support for said turner, means for imparting a step-by-step movement to said turner, and sewing mechanism.

10. In a machine of the class described, the combination with means for receiving plies of material and holding the same in parallel position, of a turner slidable between said receiving means, a tension-spring therefor, means for actuating said turner, and sewing mechanism.

11. In a machine of the class described, the combination with holding-jaws, of means for feeding plies of material into said machine outside of said jaws, means for separating said jaws and means for simultaneously turning the edges of the material inward between the same, means for closing said jaws and means for sewing through said inturned edges.

12. In a machine of the class described, the combination with mechanism for carrying plies of material through the machine, and jaws separating the same, of means for separating and closing said jaws, means for folding the edges of material over said jaws, means for carrying said edges inward between the jaws, pressure means for holding the edges of the material against the jaws and means for sewing therethrough.

13. In a machine of the class described, the combination with sewing mechanism, means for receiving plies of material, of a turner having yielding support, means normally holding said turner in inoperative position, and an actuating-cam therefor.

14. In a machine of the class described, the combination with a driving-shaft, of means actuated thereby for holding plies of material in parallel position, similarly-actuated means for turning the edges of said material inward, and sewing mechanism.

15. In a machine of the class described, the combination with a driving-shaft, means for holding plies of material in parallel position, of step-by-step edge-turning mechanism actuated by said shaft, sewing mechanism and feeding mechanism.

16. In a machine of the class described, the combination with sewing mechanism, of a pair of jaws, means for turning the edges of adjacently-arranged plies of material over said jaws, and forcing said edges inward between the jaws.

17. In a machine of the class described, the combination with a pair of jaws, means for turning the edges of adjacently-arranged plies of material over and between said jaws, and means for separating and closing said jaws.

18. In a machine of the class described, the combination with the driving-shaft, of means for holding plies of material in parallel position, jaws actuated from said shaft for bending the edges of the plies, a slidable plunger for turning the bent edges inward between the plies, sewing mechanism and feeding mechanism.

19. In a machine of the class described, the combination of a pair of jaws, means for guiding plies of material alongside of said jaws, reciprocating means for turning the projecting edges of said plies between said jaws, and means for sewing therethrough.

20. A machine of the class described, comprising in combination with a suitably-actuated needle, a driving-shaft, means actuated from said shaft for carrying two or more plies of material through the machine, and similarly-actuated means working alternately with the needle to inturn the edges of said plies.

21. In a machine of the class described, the combination with holding-jaws, and feeding mechanism, of means for separating and closing said jaws, a turner working between said separated jaws to turn the edges of the material inward, and sewing mechanism.

22. In a machine of the class described, the combination with holding-jaws, of means adjacent to said jaws for guiding the edges of the material as fed into the machine, means for separating said jaws and simultaneously turning the projecting edges of the material inward between the same, closing means for said jaws, and means for sewing through said inturned edges.

23. In a machine of the class described, the combination of a pair of jaws, means for separating and closing the same, attached guides for holding plies of material alongside of said jaws, means for turning inward between the jaws the projecting edges of said plies and means for sewing therethrough.

24. In a machine of the class described, means for holding two or more plies of material in parallel position, suitably-actuated jaws for bending the edges of the material and means for turning the bent edges of said material between the plies.

25. In a machine of the class described, means for holding two or more plies of material in parallel position, suitably-actuated means for bending the edges of said plies, and suitably-actuated, step-by-step mechanism for turning said bent edges inward between the plies.

26. In a machine of the class described, the combination with a pair of jaws, of means for bending the edges of adjacently-arranged independent plies of material over said jaws, and a turner for carrying said edges inward between said jaws.

27. In a machine of the class described, the combination with a pair of jaws, of means for bending the edges of adjacently-arranged plies of material over said jaws, a turner, and a yielding support for said turner.

28. In a machine of the class described, the combination with sewing mechanism, of a pair of jaws, means for bending the edges of adjacently-arranged plies of material over said jaws, a turner, and means for carrying said turner between said jaws.

29. In a machine of the class described, the combination with sewing mechanism, of a pair of jaws, means for bending the edges of adjacently-arranged plies of material over said jaws, means for separating and closing said jaws, a turner, and means for carrying said turner between said jaws.

30. In a machine of the class described, the combination with holding-jaws, of jaws arranged adjacent thereto, forming an intermediate passage for said material, means for actuating said second jaws to turn the edges of the material over the inner jaws, means for turning the edges inward between said inner jaws, and means for sewing through said edges.

31. In a machine of the class described, the combination with means for carrying plies of material through the machine, of jaws arranged in position to stand between said plies, means for separating said jaws, means for folding the edges of the material inward over said jaws, means for turning said edges between the jaws, means for closing said jaws, and sewing mechanism.

32. In a machine of the class described, means for holding two or more plies of material in parallel position, suitably-actuated jaws for bending the edges of said plies, and a suitably-actuated plunger for forcing said bent edges inward between the plies, and sewing mechanism.

33. In a machine of the class described, the combination of a pair of jaws, alongside of which plies of material are adapted to be passed, folding devices, means for actuating said devices to fold the edges of said material over said jaws, and means for turning said folded edges between said jaws.

34. In a machine of the class described, the combination of a pair of jaws, alongside of which plies of material are adapted to be passed, folding and turning devices, actuating means therefor, and sewing mechanism.

35. In a machine of the class described, the combination of a pair of jaws, alongside of which plies of material are adapted to be passed, folding and turning devices, actuating means therefor, feeding mechanism, and sewing mechanism.

36. In a machine of the class described, the combination of a pair of jaws, alongside of which plies of material are adapted to be passed, folding devices, means normally holding said devices separated, a turner, means for normally holding said turner in inoperative position, and sewing mechanism.

37. In a machine of the class described, the combination of a pair of jaws, alongside of which plies of material are adapted to be passed, folding devices, a spring normally holding said devices separated, means for actuating said devices against the tension of said spring, a turner, actuating means therefor, and sewing mechanism.

38. In a machine of the class described, the combination of a pair of jaws, alongside of which plies of material are adapted to be passed, folding and turning devices, supporting-yokes for said folding devices, interposed springs normally holding said yokes separated, means for actuating said yokes against the tension of said springs, and sewing mechanism.

39. In a machine of the class described, the combination with means for carrying plies of material through the machine, of holding-jaws, folding-jaws arranged adjacent thereto, actuating means for said folding-jaws mounted upon the operating-shaft, whereby said jaws are actuated to fold the edges of the material over said first jaws, means for turning said edges inward between the holding-jaws, and means for sewing therethrough.

40. In a machine of the class described, the combination with feeding mechanism, of holding-jaws, folding-jaws, cams mounted upon the operating-shaft, and adapted to actuate said folding-jaws to turn the edges of the material inward, a turning device, an operating-cam therefor adapted to actuate said device to turn the edges of the material inward between said cloth-holding jaws, and means for sewing through said material.

41. In a machine of the class described, the combination with means for carrying plies of material through the machine, means for turning the adjacent edges of said plies inward, and means for sewing therethrough, of pressure-bars upon opposite sides of said material, and means for actuating both bars to carry and hold them in gripping position against the plies of material.

42. In a machine of the class described, the combination with means for carrying plies of material through the machine, means for turning their adjacent edges inward and for sewing therethrough, pressure-bars, actuating-cams for both of said bars whereby said bars are carried into gripping contact with the turned edges of said material to hold the same in position for the needle to pass through.

43. In a machine of the class described, the combination with means for carrying plies of material to be joined through the machine, means for turning inward the adjacent edges thereof, and for sewing therethrough, of pressure-bars slidably connected together, springs normally holding said bars separated, and actuating-cams therefor whereby said bars are carried into gripping contact with the edges of the material.

44. In a machine of the class described, the combination with means for receiving plies of material and turning their adjacent edges inward, and mechanism for passing a line of sewing through said inturned edges, of means for carrying said material through the machine, consisting of a pair of arms, a supporting-slide therefor, actuating means for said slide, studs carried by said arms, and a cam working between said studs.

45. In a machine of the class described, the combination with means for receiving plies of material and turning their adjacent edges inward, and mechanism for passing a line of sewing through said inturned edges, of means for carrying said material through the machine, consisting of a pair of arms, a supporting-slide therefor, an actuating-cam for said slide, and means for adjusting the relative positions of said slide and cam.

46. In a machine of the class described, the combination with means for receiving plies of material and turning their adjacent edges inward, and mechanism for carrying said material through the machine, consisting of a pair of arms, a supporting-slide therefor, a controlling-spring for said slide, means for reciprocating said slide against the tension of said spring, and an adjusting-screw.

47. In a machine of the class described, the combination with means for receiving plies of material and turning their adjacent edges inward, and mechanism for passing a line of sewing through said inturned edges, of means for carrying said material through the machine, consisting of a pair of arms, a supporting-slide therefor, a post carried by said slide, a cam adapted to engage said post, and an adjusting-screw connecting said post and a fixed support.

48. In a machine of the class described, the combination with means for receiving plies of material and turning their adjacent edges inward, and mechanism for passing a line of sewing through said inturned edges, of means for carrying said material through the machine, consisting of a pair of arms, a supporting-slide therefor, a spring normally holding said slide in forward position, means for adjusting the position of said slide, an actuating-cam, a driving-shaft, and an operative connection between said cam and shaft.

49. In a machine of the class described, the combination with means for receiving plies of material and turning their adjacent edges inward, and mechanism for passing a line of sewing through said inturned edges, of means for carrying said material through the machine, consisting of a pair of arms, a supporting-slide, means for reciprocating said slide, a cam arranged between said arms, and means for actuating said cam to separate said arms.

50. In a machine of the class described, the combination with means for receiving plies of material and turning their adjacent edges inward, and mechanism for passing a line of sewing through said inturned edges, of means for carrying said material through the machine, consisting of a plate, feeder-arms slidably supported upon said plate, and means for reciprocating said plate.

51. In a machine of the class described, the combination with means for receiving plies of material and turning their adjacent edges inward, and mechanism for passing a line of sewing through said inturned edges, of means for carrying said material through the machine, consisting of a plate, feeder-arms slidably supported upon said plate, means for separating said arms, and means for reciprocating said plate.

52. In a machine of the class described, the combination with means for holding the edges of two or more plies of material in parallel position, means for turning the edges inward between the plies, and stitching mechanism, of a slidable device adapted to be carried into engagement with the edges of the material as the material is turned to form a corner, as and for the purpose set forth.

53. In a machine of the class described, the combination with means for holding the edges of two or more plies of material in parallel position, means for turning the edges inward between the plies, and stitching mechanism, of a slidable device adapted to be carried into engagement with the edges of the material as the same is turned to form a corner, and means for holding said device in withdrawn position, for the purpose set forth.

54. In a machine of the class described, the combination with means for holding a series of plies of material in parallel position, a plunger for turning the edges of said plies inward, and sewing mechanism, of a slidably-supported device, and means for securing said device in engagement with the edges of the material to hold the same in position to be engaged by the plunger as the material is turned to form a corner.

55. In a machine of the class described, the combination with a pair of jaws, alongside of which plies of material are adapted to be passed, a plunger for forcing the edges of the material between said jaws, and sewing mechanism, of a slidably-supported device, means for securing said device in contact with the edges of the material to hold the same in position to receive the plunger as the material is turned to form a corner, means actuated in the operation of the machine to release said device, and spring means for carrying said device to withdrawn position when released.

56. In a machine of the class described, means for carrying two or more plies of material through the machine in parallel position, a guide arranged between said plies, step-by-step mechanism for turning the edges of said plies over said guide, and sewing mechanism arranged in position to stitch through said inturned edges.

57. In a machine of the class described, means for carrying two or more plies of material through the machine in parallel position, a guide arranged between said plies, step-by-step mechanism for bending the edge of one ply toward the opposite ply, and independent step-by-step mechanism for turning said bent edge inward between the plies.

58. In a machine of the class described, means for carrying two or more plies of material through the machine in parallel position, a guide arranged between said plies, an operating-shaft, means actuated from said shaft for bending the edge of one ply over said guide toward the opposite ply, and similarly-actuated means for turning said bent edge inward between the plies.

In testimony whereof I affix my signature in the presence of two witnesses.

HERMAN NEDERMAN.

Witnesses:
H. S. JOHNSON,
ELGIE H. EVANS.